Patented Mar. 18, 1952

2,589,934

UNITED STATES PATENT OFFICE 2,589,934

2-AMINOMETHYL-TETRAHYDROACENAPTHONES-1 AND THEIR PREPARATION

Howard J. Glenn, Waukegan, and Bruce W. Horrom, Winthrop Harbor, Ill., assignors to Abbott Laboratories, North Chicago, Ill., a corporation of Illinois No Drawing. Application August 24, 1950, Serial No. 181,315

9 Claims. (Cl. 260—247.7)

This invention relates to new chemical compounds and more specifically to certain nitrogen-containing derivatives of tetrahydroacenaphthone.

These compounds may be represented by the formula

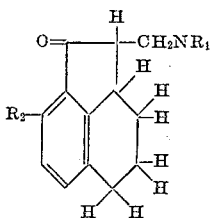

where —NR₁ represents a group containing a nitrogen atom and R₂ may be hydrogen or methoxy. For example, the group —NR₁ may represent, among others, a piperidyl, morpholino, pyrrolidino, or dimethylamino group. When administered to animals, these compounds are capable of producing analgesia. These compounds may be conveniently utilized in the form of their salts. The preferred compound is 8-methoxy-2-piperidinomethyl - 2a,3,4,5 - tetrahydroacenaphthone-1 hydrochloride.

These compounds may be conveniently prepared by reacting the appropriate 2a,3,4,5-tetrahydroacenaphthone-1 with formaldehyde (or para-formaldehyde) and the appropriate amino compound. Heat and the presence of an acid substance such as hydrochloric acid accelerate the reaction.

The invention may be illustrated, but is not necessarily limited, by the following examples.

EXAMPLE I

*8-methoxy-2-piperidinomethyl-2a,3,4,5-tetrahydroacenaphthone-1*

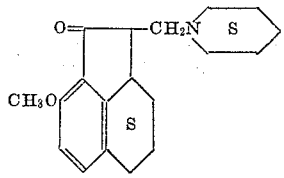

A mixture of 4.04 g. (0.02 mol) of 8-methoxy-2a,3,4,5-tetrahydroacenaphthone-1 [prepared by the method of Johnson and Glenn, J. Am. Chem. Soc., 71, 1087 (1949)], 2.51 g. (0.0205 mol) of piperidine hydrochloride, 2.0 cc. of formalin solution, and 1 drop of concentrated hydrochloric acid was heated on a steam bath under a slow stream of nitrogen until the system liquified. Mechanical stirring was started and the mixture stirred and heated under nitrogen for a period of two hours, during which time 1 drop of concentrated hydrochloric acid was added every fifteen minutes and an additional 2.0 cc. of formalin solution was added after one hour. After cooling, 25 cc. of 5% hydrochloric acid was added with stirring and the resulting solution extracted three times with ether to remove neutral contaminates. The aqueous acid solution was made strongly basic with 10% sodium hydroxide solution and the precipitated base taken up in three ether extractions. After drying the combined ethereal extracts over anhydrous magnesium sulfate, the solvent was removed under diminished pressure and the residual oil dried at room temperature at 2 mm. pressure for several hours during which time crystallization occurred. The solid was recrystallized from hexane to give fine needles, M. P. 77–78° C.

Anal. Calcd. for $C_{19}H_{25}NO_2$: C, 76.22; H, 8.42
Found: C, 76.40; H, 8.36

From one run, an isomorphic form which melted at 90–91° C. was isolated. This had the correct analysis for the free base and gave the same hydrochloride.

This material forms a hydrochloride when treated in ether solution with an ethereal solution of gaseous hydrogen chloride. The salt melts at 160–161° C. after recrystallization from a methanol and ether mixture.

Anal. Calcd. for $C_{19}H_{25}NO_2.HCl$: C, 67.94; H, 7.80; N, 4.17
Found: C, 67.94; H, 7.71; N, 4.26

This compound was also prepared by refluxing a mixture of 4.04 g. (0.02 mol) of 8-methoxytetrahydroacenaphthone-1, 2.52 g. (0.0205 mol) of piperidine hydrochloride, 1.8 g. (0.06 mol) of paraformaldehyde, 30 cc. of isoamyl alcohol, and 4 drops concentrated hydrochloric acid for a period of forty-five minutes. The product was worked up in a somewhat similar manner except that the hydrochloride was precipitated directly from the ether-isoamyl alcohol solution by ethereal hydrogen chloride without isolating the free base. The salt, after recrystallization from methanol-ether, melted at 160–161° C.

EXAMPLE II

*8-methoxy-2-morpholinomethyl-2a,3,4,5-tetrahydroacenaphthone-1*

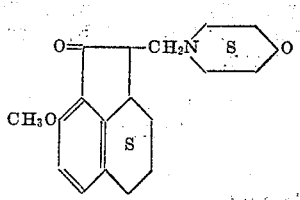

This compound was obtained by a procedure similar to that used in the preparation of the piperidinomethyl derivative using 4.04 g. (0.02 mol) of 8-methoxytetrahydroacenaphthone-1, 2.55 g. (0.0206 mol) of morpholine hydrochloride, and 4.0 cc. of formalin solution. The free base, after recrystallization from a mixture of benzene, ether and hexane, melted at 135–135.5° C.

Anal. Calcd. for $C_{18}H_{23}NO_3$: C, 71.73; H, 7.69
Found: C, 71.79; H, 7.76

This substance was prepared for testing by dissolving in dilute hydrochloric acid.

EXAMPLE III

*8-methoxy-2-pyrrolidinomethyl - 2a,3,4,5 - tetrahydroacenaphthone-1 hydrochloride*

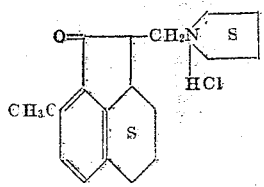

This compound was obtained by a procedure similar to that used in the preparation of the piperidinomethyl derivatives using 4.04 g. (0.02 mol) of 8-methoxytetrahydroacenaphthone-1, 1.50 g. (0.021 mol) of redistilled pyrrolidine free base, and 4.0 cc. of formalin solution except that the pyrrolidine in the mixture was neutralized first by the careful addition of 2.0 cc. of concentrated hydrochloric acid. The residual basic oil in the presence of hexane crystallized into a soft solid which was converted directly into the hydrochloride by treating it in ether solution with ethereal hydrogen chloride. This salt melted at 158–160° C. after recrystallization from methanol-ether.

Anal. Calcd. for $C_{18}H_{23}NO_2 \cdot HCl$: C, 67.17; H, 7.52
Found: C, 66.98; H, 7.44

EXAMPLE IV

*8-methoxy-2-dimethylaminomethyl-2a,3,4,5-tetrahydroacenaphthone-1*

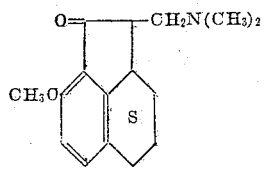

A mixture of 4.04 g. (0.02 mol) of 8-methoxytetrahydroacenaphthone-1, 2.04 g. (0.025 mol) of dimethylamine hydrochloride, 0.90 g. (0.03 mol) of paraformaldehyde, 30 cc. of isoamyl alcohol, and 4 drops of concentrated hydrochloric acid was mixed well and refluxed fifteen minutes. At fifteen minute intervals, 0.30 g. (0.01 mol) of paraformaldehyde was added for a total of six additions, each addition being followed by one drop of hydrochloric acid. The total time of reflux was one and three-fourths hours. The product was worked up in the general way described for the piperidinomethyl derivative. The free base melted at 87–88° C. after recrystallization from hexane.

Anal. Calcd. for $C_{16}H_{21}NO_2$: C, 74.10; H, 8.16
Found: C, 74.18; H, 8.01

For testing, this compound was dissolved in dilute hydrochloric acid.

EXAMPLE V

*2-piperidinomethyl-2a,3,4,5-tetrahydroacenaphthone-1 hydrochloride*

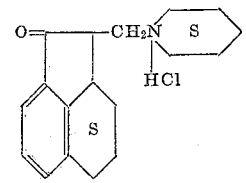

This compound was prepared by using the isoamyl alcohol procedure previously given from 4.0 g. (0.0232 mol) of tetrahydroacenaphthone-1 [prepared by the method of Johnson and Glenn, J. Am. Chem. Soc., 71, 1087 (1949)], 2.4 g. (0.0197 mol) of piperidine hydrochloride, 0.92 g. (0.03 mol) of paraformaldehyde, four drops of concentrated hydrochloric acid and 30 cc. of isoamyl alcohol. The desired hydrochloride after recrystallization from methanol-ether melted at 164–165° C.

Anal. Calcd. for $C_{18}H_{23}NO \cdot HCl$: N, 4.57
Found: N, 4.57

Others may readily adapt the invention for use under varying conditions of service, by employing one or more of the novel features disclosed, or equivalents thereof. As at present advised with respect to the apparent scope of our invention, we desire to claim the following subject matter.

We claim:

1. A member selected from the class of compounds of the formula

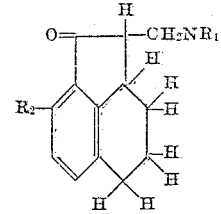

where —$NR_1$ represents a member selected from the class consisting of piperidino, morpholino, pyrrolidino, and dimethylamino groups and $R_2$ is a member selected from the class consisting of hydrogen and methoxy, and salts of these compounds.

2. The compound 8-methoxy -2- piperidinomethyl-2a,3,4,5-tetrahydroacenaphthone-1.

3. The compound 8-methoxy-2-morpholinomethyl-2a,3,4,5-tetrahydroacenaphthone-1.

4. The compound 8-methoxy-2-pyrrolidinomethyl-2a,3,4,5-tetrahydroacenaphthone-1.

5. The compound 8 - methoxy - 2 - dimethylaminomethyl-2a,3,4,5-tetrahydroacenaphthone-1.

6. The compound 2-piperidinomethyl-2a,3,4,5-tetrahydroacenaphthone-1.

7. Process for preparing compounds of the formula

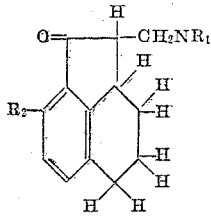

where —$NR_1$ represents a member selected from the class consisting of piperidino, morpholino, pyrrolidino, and dimethylamino groups and $R_2$ is a member selected from the class consisting of hydrogen and methoxy, which comprises; treating a compound of the formula

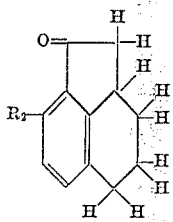

with formaldehyde and a secondary amine of the formula H—N—R₁.

8. The process according to claim 7 wherein the reaction is carried out at approximately 100° C.

9. The process according to claim 7 wherein the reaction is carried out in the presence of an acid substance.

HOWARD J. GLENN.
BRUCE W. HORROM.

REFERENCES CITED

The following references are of record in the file of this patent:

UNITED STATES PATENTS

| Number | Name | Date |
|---|---|---|
| 2,400,913 | Burger | May 26, 1946 |
| 2,441,069 | Hoffman et al. | May 4, 1948 |